United States Patent
Mikhailov et al.

(10) Patent No.: US 9,724,597 B2
(45) Date of Patent: Aug. 8, 2017

(54) MULTI-IMAGE INTERACTIVE GAMING DEVICE

(71) Applicant: Sony Interactive Entertainment Inc., Tokyo (JP)

(72) Inventors: Anton Mikhailov, Campbell, CA (US); Richard Marks, Pleasanton, CA (US); Eric Larsen, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 640 days.

(21) Appl. No.: 13/842,573

(22) Filed: Mar. 15, 2013

(65) Prior Publication Data

US 2013/0324243 A1    Dec. 5, 2013

Related U.S. Application Data

(60) Provisional application No. 61/655,459, filed on Jun. 4, 2012.

(51) Int. Cl.
*G06F 3/033*      (2013.01)
*A63F 13/04*      (2006.01)
(Continued)

(52) U.S. Cl.
CPC .............. *A63F 13/04* (2013.01); *A63F 13/06* (2013.01); *A63F 13/213* (2014.09);
(Continued)

(58) Field of Classification Search
None
See application file for complete search history.

(56) References Cited

U.S. PATENT DOCUMENTS 5,354,063 A    10/1994   Curchod
5,574,511 A *   11/1996   Yang ...................... H04N 5/272
                                                            348/586

(Continued)

FOREIGN PATENT DOCUMENTS

| WO | 2005/081677 | 9/2005 |
|---|---|---|
| WO | 2006/086508 A2 | 8/2006 |
| WO | 2010/051089 | 5/2010 |

OTHER PUBLICATIONS (Form PCT/ISA/206) PCT Invitation to Pay Additional Fees issued in International Application No. PCT/IB2013/001882, mailed Jan. 30, 2014 (5 total pages).

(Continued)

*Primary Examiner* — Dismery Mercedes
(74) *Attorney, Agent, or Firm* — Martine Penilla Group, LLP

(57) ABSTRACT

An image capture device includes: a housing; a first camera defined along a front surface of the housing; a first camera controller configured to control the first camera to capture images of an interactive environment during user interactivity at a first exposure setting; a second camera defined along the front surface of the housing; a second camera controller configured to control the second camera to capture images of the interactive environment during the user interactivity at a second exposure setting lower than the first exposure setting, the captured images from the second camera being analyzed to identify and track an illuminated object in the interactive environment.

17 Claims, 11 Drawing Sheets

(51) Int. Cl.

| | | |
|---|---|---|
| *A63F 13/06* | (2006.01) | |
| *A63F 13/219* | (2014.01) | |
| *A63F 13/5252* | (2014.01) | |
| *G06T 5/00* | (2006.01) | |
| *A63F 13/20* | (2014.01) | |
| *A63F 13/213* | (2014.01) | |
| *A63F 13/42* | (2014.01) | |
| *A63F 13/843* | (2014.01) | |
| *A63F 13/428* | (2014.01) | |
| *A63F 13/24* | (2014.01) | |
| *A63F 13/235* | (2014.01) | |
| *G06F 3/01* | (2006.01) | |
| *A63F 13/424* | (2014.01) | |
| *A63F 13/22* | (2014.01) | |

(52) U.S. Cl.
CPC .......... *A63F 13/235* (2014.09); *A63F 13/24* (2014.09); *A63F 13/42* (2014.09); *A63F 13/428* (2014.09); *A63F 13/5252* (2014.09); *A63F 13/843* (2014.09); *G06F 3/011* (2013.01); *G06F 3/012* (2013.01); *G06T 5/007* (2013.01); *A63F 13/22* (2014.09); *A63F 13/424* (2014.09); *A63F 2300/1093* (2013.01); *A63F 2300/6045* (2013.01); *A63F 2300/6072* (2013.01); *G06T 2207/10152* (2013.01)

(56) References Cited

U.S. PATENT DOCUMENTS

| | | | | |
|---|---|---|---|---|
| 7,623,115 B2* | 11/2009 | Marks | | G06F 3/017 345/156 |
| 7,874,917 B2* | 1/2011 | Marks | | A63F 13/02 463/36 |
| 8,221,229 B2* | 7/2012 | Mikhailov | | A63F 13/06 463/25 |
| 8,323,106 B2* | 12/2012 | Zalewski | | G06F 3/0304 30/32 |
| 8,427,426 B2* | 4/2013 | Corson | | G06F 3/0325 345/157 |
| 8,686,943 B1* | 4/2014 | Rafii | | G06F 3/017 345/158 |
| 8,860,875 B2* | 10/2014 | Fujii | | G03B 7/093 348/169 |
| 9,129,181 B1* | 9/2015 | Nathan | | G06K 9/3241 |
| 2002/0085097 A1* | 7/2002 | Colmenarez | | G06F 3/0304 348/211.4 |
| 2004/0207597 A1* | 10/2004 | Marks | | G06F 3/017 345/156 |
| 2007/0093291 A1 | 4/2007 | Hulvey | | |
| 2007/0189386 A1* | 8/2007 | Imagawa | | G06T 3/0087 375/240.12 |
| 2008/0180438 A1 | 7/2008 | Sasaki et al. | | |
| 2008/0261693 A1* | 10/2008 | Zalewski | | G06F 3/0304 463/31 |
| 2009/0138805 A1 | 5/2009 | Hildreth | | |
| 2009/0221368 A1* | 9/2009 | Yen | | A63F 13/10 463/32 |
| 2010/0105475 A1* | 4/2010 | Mikhailov | | A63F 13/06 463/33 |
| 2010/0269072 A1* | 10/2010 | Sakata | | G06F 1/1601 715/863 |
| 2010/0303297 A1* | 12/2010 | Mikhailov | | G06T 7/11 382/103 |
| 2011/0118032 A1* | 5/2011 | Zalewski | | A63F 13/428 463/39 |
| 2011/0119640 A1* | 5/2011 | Berkes | | G06F 3/011 715/863 |
| 2011/0159814 A1* | 6/2011 | Mallinson | | A63F 13/12 455/41.2 |
| 2011/0249142 A1* | 10/2011 | Brunner | | H04N 5/23219 348/229.1 |
| 2011/0285897 A1* | 11/2011 | Fujii | | G03B 7/093 348/345 |
| 2012/0056982 A1* | 3/2012 | Katz | | H04N 13/025 348/43 |
| 2012/0124456 A1 | 5/2012 | Perez et al. | | |
| 2012/0159330 A1 | 6/2012 | Jeong et al. | | |
| 2012/0206345 A1 | 8/2012 | Langridge | | |
| 2013/0010207 A1 | 1/2013 | Valik et al. | | |
| 2013/0100255 A1* | 4/2013 | Ohba | | G06T 3/4038 348/47 |
| 2013/0102387 A1 | 4/2013 | Barsoum et al. | | |
| 2013/0113956 A1* | 5/2013 | Anderson | | G06F 3/017 348/223.1 |
| 2013/0154917 A1* | 6/2013 | Adermann | | G06F 3/005 345/156 |
| 2013/0182079 A1* | 7/2013 | Holz | | G06T 7/0075 348/47 |
| 2013/0182897 A1* | 7/2013 | Holz | | G06K 9/00711 382/103 |
| 2014/0359651 A1 | 12/2014 | Lee et al. | | |

OTHER PUBLICATIONS

PCT International Search Report and Written Opinion of the International Searching Authority (ISA) issued in International Application No. PCT/IB2013/001882, European Patent Office, May 26, 2014.

English translation of Notification of Reason(s) for Refusal issued in corresponding Japanese Application No. 2015-514615, dated Jan. 5, 2016 (5 pages).

* cited by examiner

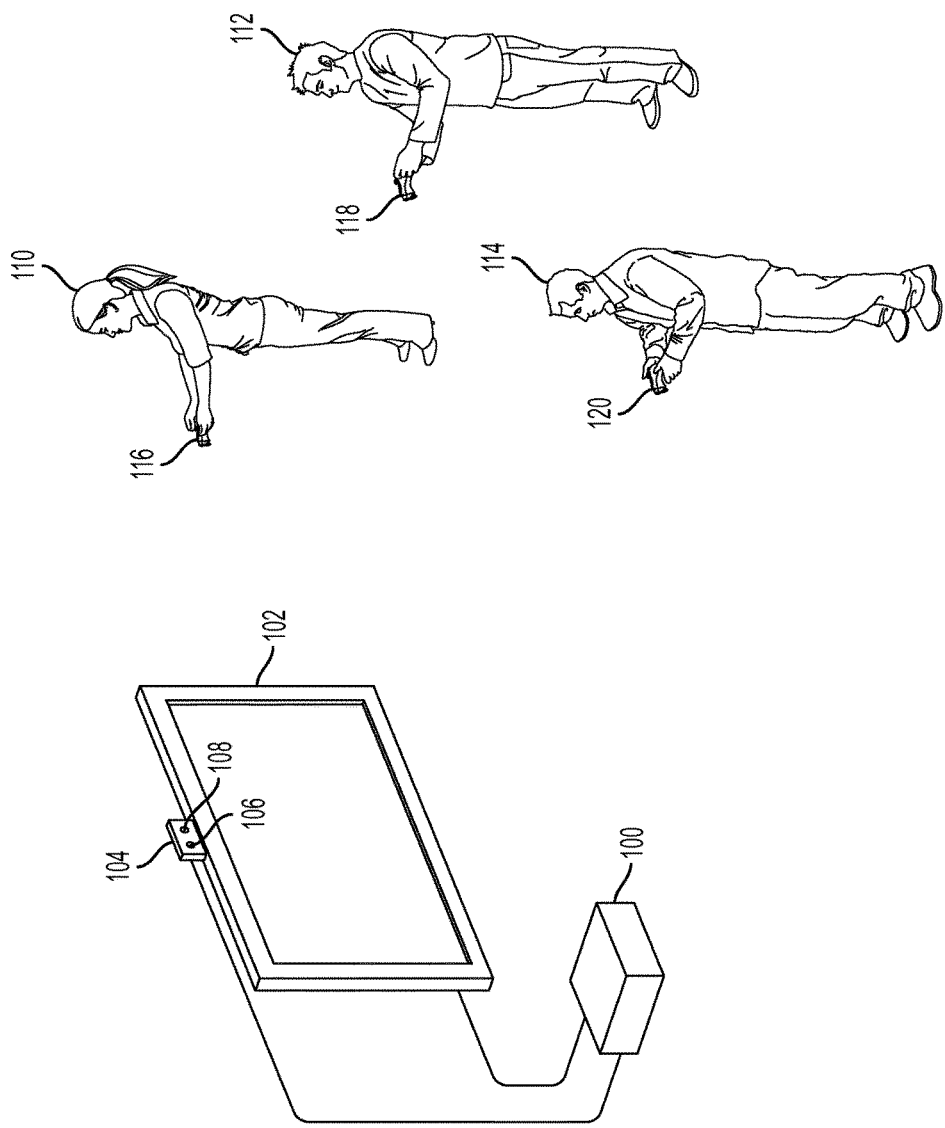

MULTI-IMAGE INTERACTIVE GAMING DEVICE

CLAIM OF PRIORITY

This application claims priority to U.S. Provisional Application No. 61/655,459, filed Jun. 4, 2012, entitled "Multi-Image Interactive Gaming Device," the disclosure of which is incorporated by reference herein.

RELATED APPLICATIONS

This application is related to U.S. application Ser. No. 13/539,311, filed Jun. 30, 2012, entitled "Gaming Controller."

This application is related to U.S. Pat. No. 7,760,248, issued Jul. 20, 2010, entitled "Selective Sound Source Listening in Conjunction with Computer Interactive Processing."

This application is related to U.S. Provisional Application No. 61/745,281, filed Dec. 21, 2012, entitled "Automatic Generation of Suggested Mini-Games for Cloud-Gaming Based on Recorded Gameplay."

The disclosures of these applications are herein incorporated by reference in their entirety for all purposes.

BACKGROUND

1. Field of the Invention

The present invention relates to controllers for interfacing with an interactive program.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. One example of a handheld controller is the DUALSHOCK® 3 wireless controller manufactured by Sony Computer Entertainment Inc.

It is in this context that embodiments of the invention arise.

SUMMARY

Embodiments of the present invention provide systems and methods for interfacing with an interactive application such as a video game. Several inventive embodiments of the present invention are described below.

In one embodiment, an image capture device for providing input to an interactive application is provided. The image capture device includes: a housing; a first camera defined along a front surface of the housing; a first camera controller configured to control the first camera to capture images of an interactive environment during user interactivity at a first exposure setting; a second camera defined along the front surface of the housing; a second camera controller configured to control the second camera to capture images of the interactive environment during the user interactivity at a second exposure setting lower than the first exposure setting, the captured images from the second camera being analyzed to identify and track an illuminated object in the interactive environment.

In one embodiment, the captured images from the first camera are analyzed to identify and track a user.

In one embodiment, identifying and tracking the user includes identifying and tracking a face of the user.

In one embodiment, the first camera and the second camera are horizontally aligned along the front surface of the housing.

In one embodiment, the image capture device further includes a microphone array for capturing sound from the interactive environment.

In one embodiment, the first camera controller is configured to control the first camera to capture images of the interactive environment prior to the user interactivity, the images captured prior to the user interactivity being analyzed to determine the first exposure setting.

In one embodiment, the second camera controller is configured to control the second camera to capture images of the interactive environment prior to the user interactivity, the images captured prior to the user interactivity being analyzed to determine the second exposure setting.

In another embodiment, a system for facilitating interactivity with an interactive application is provided, including: an image capture device, the image capture device including a first camera, a second camera, a first camera controller configured to control the first camera to capture images of an interactive environment during user interactivity at a first exposure setting, and a second camera controller configured to control the second camera to capture images of the interactive environment during the user interactivity at a second exposure setting lower than the first exposure setting; a computing device connected to the image capture device, the computing device configured to execute the interactive application, the computing device configured to analyze the captured images from the second camera to identify and track an illuminated object in the interactive environment.

In one embodiment, the computing device is configured to analyze the captured images from the first camera to identify and track a user.

In one embodiment, identifying and tracking the user includes identifying and tracking a face of the user.

In one embodiment, the first camera and the second camera are horizontally aligned along the front surface of the housing.

In one embodiment, the system further includes a microphone array for capturing sound from the interactive environment.

In one embodiment, the first camera controller is configured to control the first camera to capture images of the interactive environment prior to the user interactivity, the images captured prior to the user interactivity being analyzed to determine the first exposure setting.

In one embodiment, the second camera controller is configured to control the second camera to capture images of the interactive environment prior to the user interactivity, the images captured prior to the user interactivity being analyzed to determine the second exposure setting.

In another embodiment, a method for interactivity with an interactive application is provided, including the following method operations: capturing images from an interactive environment during user interactivity at a first exposure setting; capturing images from the interactive environment during the user interactivity at a second exposure setting lower than the first exposure setting; analyzing the images captured at the second exposure setting to identify and track an illuminated object in the interactive environment.

In one embodiment, the method further includes analyzing the images captured at the first exposure setting to identify and track a user.

In one embodiment, identifying and tracking the user includes identifying and tracking a face of the user.

In one embodiment, the method further includes analyzing the images captured at the first exposure setting to identify and track an AR tag.

In one embodiment, the method further includes capturing sound from the interactive environment.

In one embodiment, the method further includes capturing images of the interactive environment prior to the user interactivity; and analyzing the images captured prior to the user interactivity to determine one or more of the first exposure setting or the second exposure setting.

In another embodiment, a method for managing multi-player interactivity with an interactive application is provided, including the following method operations: determining a location of a first controller; determining a location of a second controller; determining a location of a biometric identifier of a first user; determining a location of a biometric identifier of a second user; pairing the first controller to the first user based on the location of the first controller and the location of the biometric identifier of the first user; pairing the second controller to the second user based on the location of the second controller and the location of the biometric identifier of the second user; wherein the method is executed by a processor.

In one embodiment, determining the location of the first controller includes identifying an illuminated portion of the first controller; and determining the location of the second controller includes identifying an illuminated portion of the second controller.

In one embodiment, identifying the illuminated portion of the first controller includes identifying a first color defined by the illuminated portion of the first controller; and identifying the illuminated portion of the second controller includes identifying a second color defined by the illuminated portion of the second controller, the second color being a different color than the first color.

In one embodiment, the method further includes: determining a previous pairing of the first controller to the second user; determining a previous pairing of the second controller to the first user; changing the illuminated portion of the first controller from the first color to the second color; changing the illuminated portion of the second controller from the second color to the first color.

In one embodiment, the biometric identifier of the first user is defined by one or more of a face, a voice, a size, or a fingerprint of the first user; and the biometric identifier of the first user is defined by one or more of a face, a voice, a size, or a fingerprint of the second user.

In one embodiment, determining the location of the biometric identifier of the first user includes determining a vicinity of the first controller and searching the vicinity of the first controller to identify the biometric identifier of the first user; and determining the location of the biometric identifier of the second user includes determining a vicinity of the second controller and searching the vicinity of the second controller to identify the biometric identifier of the second user.

In one embodiment, the method further includes presenting a split-screen view of the interactive application, the split-screen view including a first view defined for the first user and a second view defined for the second user; wherein locations of the first view and the second view in the split-screen view are determined based on one or more of the location of the first controller, the location of the second controller, the location of the biometric identifier of the first user, or the biometric identifier of the second user.

In one embodiment, any of the presently described methods is defined in the form of program instructions embodied on a computer readable medium.

In another embodiment, a method for managing multi-player interactivity with an interactive application is provided, including the following method operations: capturing images of an interactive environment; analyzing the captured images to determine a location of a first controller; analyzing the captured images to determine a location of a second controller; analyzing the captured images to determine a location of a biometric identifier of a first user; analyzing the captured images to determine a location of a biometric identifier of a second user; pairing the first controller to the first user based on the location of the first controller and the location of the biometric identifier of the first user; pairing the second controller to the second user based on the location of the second controller and the location of the biometric identifier of the second user; wherein the method is executed by a processor.

In one embodiment, analyzing the captured images to determine the location of the first controller includes identifying an illuminated portion of the first controller; and analyzing the captured images to determine the location of the second controller includes identifying an illuminated portion of the second controller.

In one embodiment, identifying the illuminated portion of the first controller includes identifying a first color defined by the illuminated portion of the first controller; and identifying the illuminated portion of the second controller includes identifying a second color defined by the illuminated portion of the second controller, the second color being a different color than the first color.

In one embodiment, the method further includes: determining a previous pairing of the first controller to the second user; determining a previous pairing of the second controller to the first user; changing the illuminated portion of the first controller from the first color to the second color; changing the illuminated portion of the second controller from the second color to the first color.

In one embodiment, the biometric identifier of the first user is defined by a face of the first user; and the biometric identifier of the first user is defined by a face of the second user.

In one embodiment, analyzing the captured images to determine the location of the biometric identifier of the first user includes determining a vicinity of the first controller and searching the vicinity of the first controller to identify the biometric identifier of the first user; and analyzing the captured images to determine the location of the biometric identifier of the second user includes determining a vicinity of the second controller and searching the vicinity of the second controller to identify the biometric identifier of the second user.

In one embodiment, the method further includes: presenting a split-screen view of the interactive application, the split-screen view including a first view defined for the first user and a second view defined for the second user; wherein locations of the first view and the second view in the split-screen view are determined based on one or more of the location of the first controller, the location of the second controller, the location of the biometric identifier of the first user, or the biometric identifier of the second user.

In another embodiment, a method for managing multi-player interactivity with an interactive application executing on a cloud processing server is provided, including the following method operations: receiving image data captured from an interactive environment; processing the captured image data to determine a location of a first controller, a location of a second controller, a location of a biometric identifier of a first user, and a location of a biometric identifier of a second user; pairing the first controller to the first user based on the location of the first controller and the location of the biometric identifier of the first user; pairing the second controller to the second user based on the location of the second controller and the location of the biometric identifier of the second user; wherein the method is executed by a processor.

In one embodiment, determining the location of the first controller includes analyzing the captured image data to identify an illuminated portion of the first controller; and determining the location of the second controller includes analyzing the captured image data to identify an illuminated portion of the second controller.

In one embodiment, identifying the illuminated portion of the first controller includes identifying a first color defined by the illuminated portion of the first controller; and identifying the illuminated portion of the second controller includes identifying a second color defined by the illuminated portion of the second controller, the second color being a different color than the first color.

In one embodiment, the method further includes determining a previous pairing of the first controller to the second user; determining a previous pairing of the second controller to the first user; sending an instruction to change the illuminated portion of the first controller from the first color to the second color; sending an instruction to change the illuminated portion of the second controller from the second color to the first color.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 1A illustrates an interactive environment in which multiple players are interacting with a video game, in accordance with an embodiment of the invention.

DETAILED DESCRIPTION

Figure 1B:
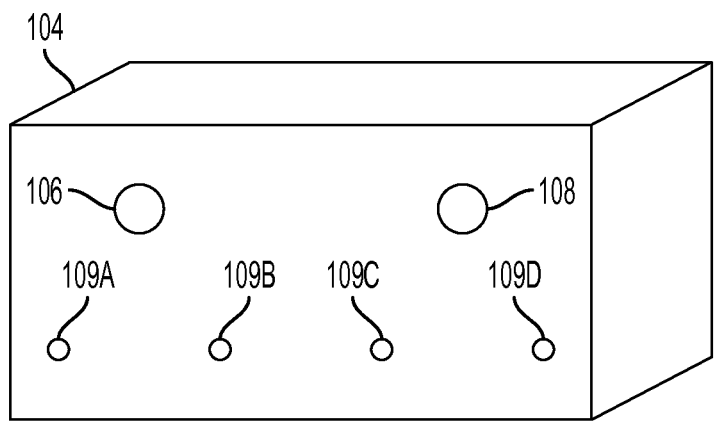
FIG. 1B illustrates an image capture device, in accordance with an embodiment of the invention.

The following embodiments describe methods and apparatus for interfacing with an interactive program.

It will be obvious, however, to one skilled in the art, that the present invention may be practiced without some or all of these specific details. In other instances, well known process operations have not been described in detail in order not to unnecessarily obscure the present invention.

FIG. 1A illustrates an interactive environment in which multiple players are interacting with a video game, in accordance with an embodiment of the invention. A computing device 100 provides image data and audio data for rendering a video game on a display 102. The computing device 100 can be a general purpose computer, a gaming console, or any other type of device configured to provide the image data and audio data of the video game to the display 102. The video game can be executed on the computing device 100, or may be executed remotely, with the computing device 100 acting as a terminal for providing image data and audio data for rendering and for receiving and transmitting input from users. An image capture device 104 includes two cameras: a high exposure camera 106, and a low exposure camera 108. The high exposure camera 106 is configured to capture images of the interactive environment at an exposure level set to enable capture of a high amount of detail of the interactive environment. Broadly speaking, the exposure level of the high exposure camera 106 can be determined based on the overall dynamic range of light intensity from the interactive environment and optimized to enable maximum capture of detail. By contrast, the low exposure camera 108 is configured to capture images of the interactive environment at a lower exposure level set to capture a comparatively low amount of detail of the interactive environment. Broadly speaking, the exposure level of the low exposure camera 108 can also be determined based on the overall dynamic range of light intensity of the interactive environment, but is set at a lower level which enables capture of images with less detail. Because the exposure level of the low exposure camera 108 is set at a lower level than that of the high exposure camera 106, the captured images from the low exposure camera 108 will provide less detail or no detail at all from regions of the interactive environment which have lower light intensity.

FIG. 1B illustrates the image capture device 104, including the high exposure camera 106 and the low exposure camera 108. In some embodiments, the high exposure camera 106 is also a higher resolution camera than the low exposure camera 108. The resolution of both the high exposure camera 106 and the low exposure camera 108 may also be set during operation of the image capture device 104. Thus, the high exposure camera may also capture more detail and produce larger quantities of data as a result of having a higher resolution compared to the low exposure camera 108 which has a lower resolution. The high exposure camera 106 and the low exposure camera 108 can be separated from each other by a known distance, and may be operated in tandem to enable stereoscopic image capture. Because the distance between the cameras is known, three-dimensional effects can be provided based on the stereoscopic image capture. In one embodiment, the high exposure camera 106 and the low exposure camera 108 are separated from each other by a distance of approximately six to ten centimeters. In other embodiments, the cameras are separated from each other by more than ten centimeters.

In some embodiments, the high and low exposure cameras each have the same hardware capabilities, but are controlled to operate in a different manner, so that one achieves a higher exposure or resolution than the other.

Additionally, the image capture device 104 may include a microphone array, including microphones 109A, 109B, 109C, and 109D. The microphone array can be utilized to capture sound from the interactive environment. Additionally, the sound from each of the microphones of the microphone array can be analyzed to determine the location of sounds in the interactive environment. Specific sound zones can be defined within the interactive environment from which sound is captured. The sound zones may be determined in accordance with zones of interactivity as are described elsewhere herein. By way of example, sound captured from a given interactive zone may be associated with a specific user and processed for that user's gameplay to the exclusion of sounds originating from outside of the interactive zone.

Figure 1C:
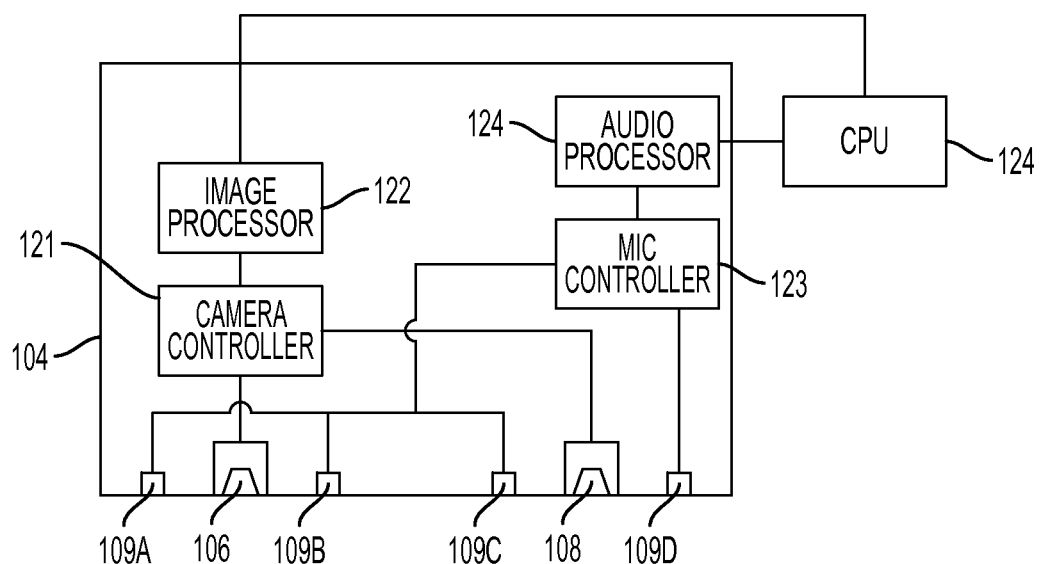
FIG. 1C is a schematic of an image capture device, in accordance with an embodiment of the invention.

FIG. 1C illustrates a schematic of the image capture device 104, in accordance with an embodiment of the invention. The image capture device 104 includes the high and low exposure cameras 106 and 108, respectively, which are controlled by a camera controller 121. The camera controller 121 can control various settings of the cameras, such as frame rate of image capture, shutter speed or time of each capture, resolution, aperture, and various other image capture characteristics. An image processor 122 performs onboard image processing, e.g. raw data conversion, image data compression or conversion, etc. A microphone controller 123 controls sensitivity of the microphones 109A-D. In one embodiment, the microphone controller 123 also controls the direction of each microphone. An audio processor 124 performs onboard processing of the audio data, e.g. analog to digital conversion, audio data compression. In some embodiments, the audio processor 124 can be configured to perform identification of sound sources in the interactive environment, or may be configured to process incoming audio signals from the microphone array so as to reduce or eliminate sounds which are not from one or more specified zones in the interactive environment.

The image capture device is operatively connected to a CPU 124, which may be a processor of a game console or local computing device, or may be a processor of a remote computing device, such as a cloud-computing device. The CPU 124 can receive image streams of the high and low exposure cameras as well as audio streams from the microphone array, for processing and analysis, in accordance with the principles and methods described herein.

Figure 2:
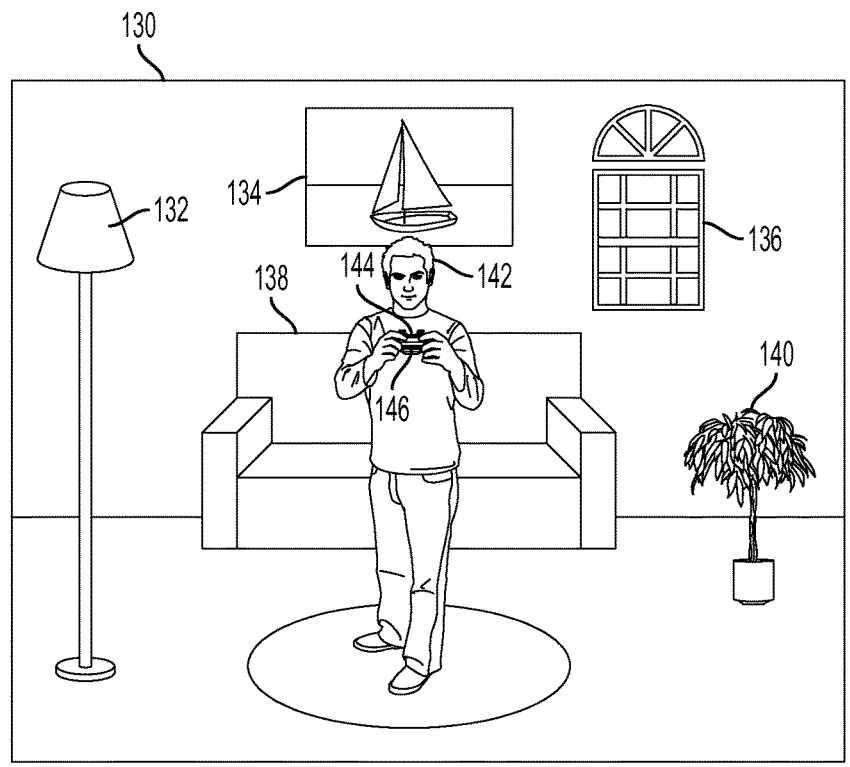
FIG. 2 illustrates an image of an interactive environment captured by the high exposure camera, in accordance with an embodiment of the invention.

FIG. 2 illustrates an image 130 of an interactive environment captured by the high exposure camera 106. In the interactive environment, there are present multiple objects, including a lamp 132, a picture 134, a window 136, a couch 138, and a plant 140, all of which are visible in the image 130. A user 142 operates a controller 144 which includes an illuminated tracking feature 146. The user 142 and the controller 144 are also visible in the captured image 130.

Figure 3:
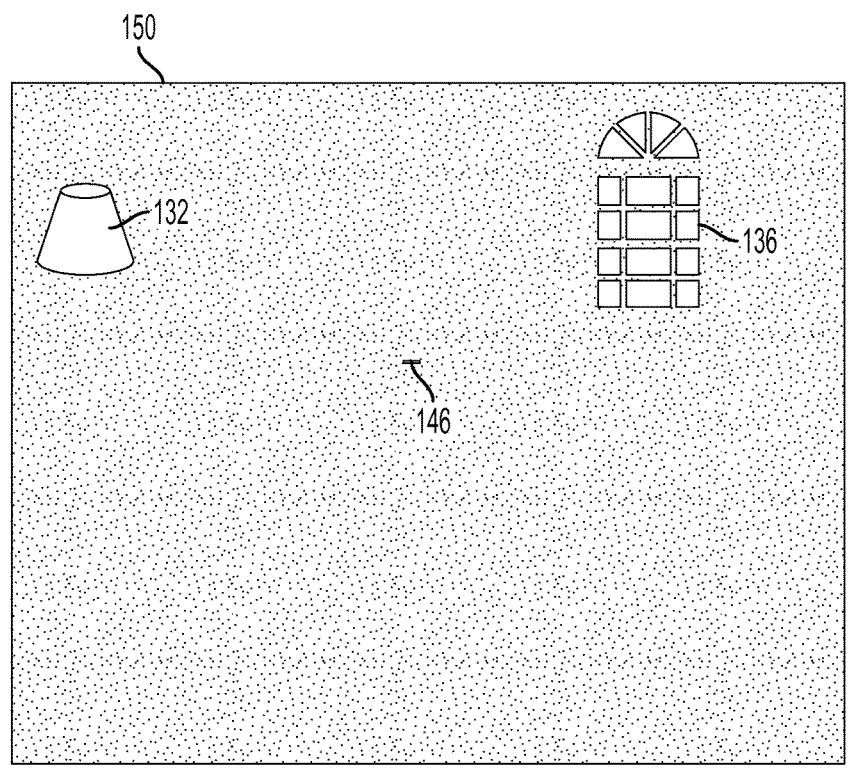
FIG. 3 illustrates an image of an interactive environment captured by a low exposure camera, in accordance with an embodiment of the invention.

FIG. 3 illustrates an image 150 of the same interactive environment captured by the low exposure camera 108. In the image 150, because the exposure level of the low exposure camera 108 is lower than that of the high exposure camera 106, only the brightest objects which produce high light intensities in the interactive environment are visible. As shown, only a lighted portion of the lamp 132, the window 136, and the illuminated tracking feature 146 of the controller 144 are visible in the image 150, as these objects produce the highest light intensities in the interactive environment.

In accordance with embodiments of the invention, the captured images from the low exposure camera 108 can be utilized for detection and tracking of the illuminated tracking feature 146 of the controller 144. Because the images from the low exposure camera 108 are captured at a lower exposure setting than those from the high exposure camera 106, they will, in most circumstances, have less data than the images captured by the high exposure camera of the same interactive environment. Thus, assuming that the illuminated tracking feature 146 is bright enough (produces a high enough light intensity) to be detected in the captured images from the low exposure camera 108, then the detection and tracking of the illuminated tracking feature based on analysis of these images requires less processing than would be required based on analysis of higher exposure images.

Also, in accordance with embodiments of the invention, the low exposure camera 108 may utilize a smaller aperture than that of the high exposure camera 106, thereby providing for sharper depth of field over a broader range of depth than is possible with the larger aperture of the high exposure camera 106. This further enhances accurate detection and tracking of the tracking feature 146 of the controller 144, providing especially improved accuracy of depth detection over that which would be obtained from analysis of higher exposure images captured utilizing a larger aperture.

It will be appreciated that for detection and tracking of the illuminated tracking feature 146 based on analysis of captured images from the low exposure camera 108, it is desirable for the illuminated tracking feature 146 to be among the brighter of brightest objects in the interactive environment. To ensure this is the case, in one embodiment, the overall dynamic range of the interactive environment is determined, and the light intensity of the illuminated tracking feature 146 is then adjusted so as to be among the brighter or brightest objects in the interactive environment. If the light intensity of the illuminated tracking feature 146 is adjusted to be the brightest object in the interactive environment, then the exposure setting of the low exposure camera 108 can be set to a value that eliminates the remainder of the interactive environment from images captured by the low exposure camera 108, thereby simplifying the process of detection and tracking of the illuminated tracking feature 146 based on such images, as the illuminated tracking feature 146 is essentially the only detectable object in such images.

However, it may also be desirable to not set the illuminated tracking feature 146 to be the brightest object in the interactive environment, for example, so as not to be distracting or appear visually out of place to users or others in the interactive environment. Thus, in various embodiments, the light intensity level of the illuminated tracking feature 146 can be defined to be equal to the highest value of the overall dynamic range of the interactive environment (i.e. equal to the brightest object(s) in the interactive environment). In another embodiment, the light intensity level of the illuminated tracking feature 146 can be set to be within a certain fraction of the upper end of the dynamic range, e.g. within the top n% of the dynamic range of the interactive environment. In some embodiments, the light intensity level of the illuminated tracking feature 108 can be set based on median light intensity values for the interactive environment, such that the illuminated tracking feature has a light intensity among the highest light intensity values of the interactive environment.

In some embodiments, the light intensity value of the illuminated tracking feature 108 relative to the overall dynamic range of the interactive environment can be set based on light intensity characteristics of the interactive environment. For example, in one embodiment, if the overall ambient lighting conditions of the interactive environment are determined to be low, then the light intensity of the illuminated tracking feature 108 is set to be lower than the maximum light intensity detected from the interactive environment. Whereas if the overall ambient lighting conditions of the interactive environment are determined to be high, then the light intensity of the illuminated tracking feature 108 is set to be greater than or equal to the maximum detected light intensity from the interactive environment. If this is not possible, then the light intensity of the illuminated tracking feature is set to its maximum possible value. In this manner, when low ambient lighting conditions are detected, the light intensity of the illuminated tracking feature 108 is adjusted so as not be visually distracting in an otherwise low ambient light environment.

Whereas when high ambient lighting conditions are detected, then the light intensity of the illuminated tracking feature 108 is adjusted to be brighter relative to the overall interactive environment because under high ambient lighting conditions, a bright object may be perceived as less intrusive.

Figure 4:
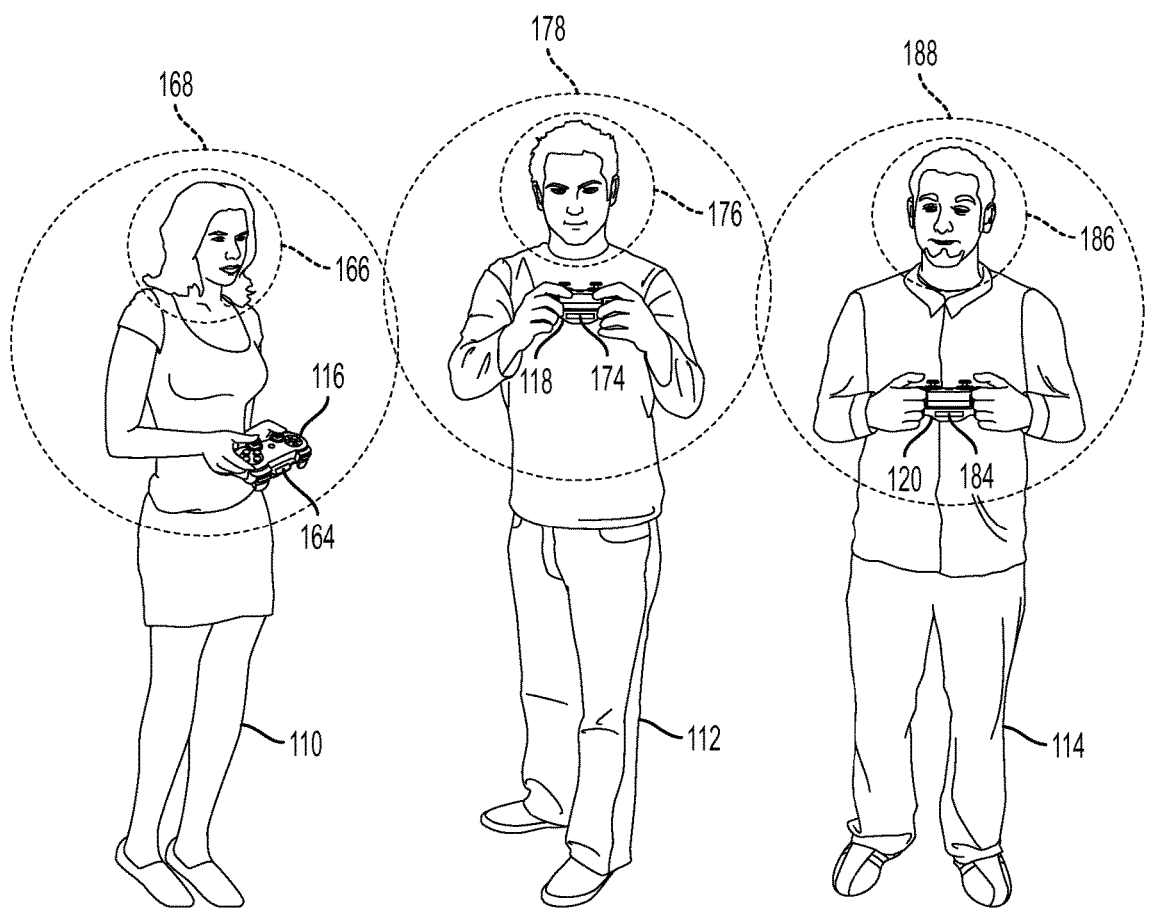
FIG. 4 illustrates a plurality of users operating controllers for interacting with an application in an interactive environment, in accordance with an embodiment of the invention.

FIG. 4 illustrates a plurality of users operating controllers for interacting with an application in an interactive environment, in accordance with an embodiment of the invention. In the illustrated scene, the user 110 operates a controller 116 having an illuminated tracking feature 164; the user 112 operates a controller 118 having an illuminated tracking feature 174; and the user 114 operates a controller 120 having an illuminated tracking feature 184. In accordance with principles described herein, images of the interactive environment are captured by the high exposure camera 106 and the low exposure camera 108. Examples of controllers include motion controllers such as the Playstation Move motion controller manufactured by Sony Computer Entertainment.

In one embodiment, the captured images of the interactive environment from the high exposure camera 106 are analyzed to determine the locations of the players. More specifically, the captured images can be analyzed to determine facial regions which contain the faces of the users. In the illustrated embodiment, a facial region 166 includes the face of the user 110; a facial region 176 includes the face of the user 112, and a facial region 186 includes the face of the user 114. The identified facial regions can be tracked based on analysis of the captured images from the high exposure camera 106. It will be appreciated that the illustrated facial regions are shown by way of example only, and may have various shapes and sizes in accordance with the specifics of the facial recognition methods employed. Facial regions may include the entire head of a user, or may include only selected features of a user's head, e.g., a region including the eyes, nose and mouth, but excluding other features of the user's face and head.

The captured images of the interactive environment from the low exposure camera 108 are analyzed to detect the orientation and three-dimensional location of the illuminated tracking features of the controllers, and consequently the location of the controllers themselves. Broadly speaking, the orientation and size of an illuminated tracking feature in the captured images can be analyzed to determine its orientation and location within the interactive environment, and consequently the orientation and location of the controller with which the illuminated tracking feature is associated. The illuminated tracking features 164, 174, and 184 may be configured to display a different color, pattern, or other differentiating characteristic to facilitate their identification and tracking via the low exposure camera 108.

In some embodiments, each controller is associated or paired with a particular user for purposes of providing precise interactive input with an application. For example, in a multi-player video game, there may be several users, each of whom is represented in the video game by an associated character, avatar, object or other representative entity in the video game. In many such video games, each user is responsible for controlling their representative entity, and so each controller is associated with a particular user. Conventional methods of associating a controller with a user have generally required users to carefully indicate selections through cumbersome menus and procedures, often requiring adherence to strict procedures which delay actual gameplay. However, in accordance with principles described herein, significantly less intrusive methods can be employed to associate controllers with users.

In one embodiment, each controller is configured to have its illuminated tracking feature display a unique characteristic, such as a unique color. On this basis, each controller is identified based on analysis of captured images by the low exposure camera. With reference to FIG. 4 by way of example, when the controller 116 is identified based on detection of the illuminated tracking feature 164, a facial search region 168 proximate to the controller is defined, within which a facial recognition process is applied. The facial search region 168 is defined as a region of the interactive environment in which a user's face may be reasonably expected to exist if the controller is being operated by a user for interactivity. The facial search region can be determined based on a predefined distance from the controller or a predefined region shape oriented about a controller, by way of example. In the illustrated embodiment, application of the facial recognition process to the facial search region 168 results in identification of the facial region 166 containing the face of the user 110. The identified face of the user 110 is therefore associated with the controller 116. In a similar manner, the controllers 118 and 120 can be identified based on their illuminated tracking features 174 and 184, respectively. The facial search regions 178 and 188 are then defined for the controllers 118 and 120, respectively. Applying facial recognition process to these facial search regions identifies the facial region 176 of the user 112 and the facial region 186 of the user 114. Therefore, the facial region 176 of the use 112 is associated with the controller 118 and the facial region 186 is associated with the user 114. Application of the presently described method can improve the identification and association of controller and users in dark environments. For instead of searching an entire captured region for the faces of users, limited search regions and identified for searching based on identification of the controller locations first. Also, as the users move over time, their facial regions and their associated controllers can be tracked.

In another embodiment, faces of users and controllers are each identified in the interactive environment, the faces being identified based on application of a facial recognition process to captured images from the high exposure camera, and the controllers being identified based on analysis of the captured images from the low exposure camera. For each controller or identified face, a corresponding nearest identified face or controller is associated therewith. In one embodiment, the association of controller with an identified face may occur if the controller and the face are not separated by more than a predetermined distance. In other embodiments, when two faces are equidistant from a given controller, then preference may be given to the face which is longitudinally closer to the given controller. Or other controllers and faces may first be associated before associating the given controller, so that other faces may be eliminated from consideration.

It will be appreciated that according to the methods presently described, faces which are not found within a vicinity of a controller are not associated with a controller. And a controller for which no face is identified in proximity to it is not associated with any user's face. Thus, users who are not participating in the video game or controllers which are not in use are not associated or improperly activated for purposes of interactivity with the video game.

In one embodiment, a profile picture of each user's face is saved. The profile picture of a given user is utilized to recognize the user in subsequent captured images taken by the high exposure camera 108. Each controller, as indicated above, is configured via its illuminated tracking feature to display a different characteristic, such as a different color. For each user whose face is detected in the interactive environment, the nearest identified controller is assigned to that user. Thus, with continued reference to FIG. 4, the user 110 is identified based on facial recognition of the facial region 166, and the controller 116 is identified based on, for example a unique color displayed by the illuminated tracking feature 164. Then the controller 116, being the nearest identified controller to the user 110, is associated with the user 110 for purposes of interactivity with the interactive application. In a similar manner, each of controllers 118 and 120 are configured to have their illuminated tracking features 174 and 184, respectively, display unique colors. Then, based on facial recognition of the facial regions 176 and 186, users 112 and 114 are identified. The identified controller 118 is then associated with user 112 because it is determined to be the nearest controller to user 112, whereas controller 120 is associated with user 114 because it is determined to be the nearest controller to user 114.

It will be appreciated that in various embodiments, the method of identifying which controller to associate with which user can employ various technologies. For example, a "nearest" controller can be determined based in part on body recognition in association with facial recognition, to determine or estimate an expected location of a controller relative to a user. The expected location might be a region approximately in front of the user in a vicinity of the user's midsection, for example. Recognition of users' arms or other body features may enhance the accuracy of the controller association process.

By utilizing facial recognition and controller recognition to properly associate/assign a particular controller with a specific user, the cumbersome initialization procedures are avoided. Furthermore, if users switch controllers for some reason (e.g., the users take a break from the game and later resume play, but switch controllers in the process) then the correct controller can be quickly assigned to the appropriate user without requiring further user input. Accordingly, in one embodiment, the controller assignment process is executed not only during initiation of the interactive video game, but also following breaks or pauses in the interactivity. This may occur, for example, when a user pauses and resumes gameplay, when the video game transitions between sections or levels, or any other break or time period when users may switch controllers.

In accordance with another embodiment, in certain interactive video games, players may be assigned to specific interactive zones of gameplay. By way of example, each interactive zone may correspond to a particular character or entity that is controlled through user interactivity detected in the interactive zone.

However, if users switch zones, then the correspondence between a particular user and his/her entity is broken. Therefore, in accordance with principles described herein, when a user's face and a controller are recognized in a specific interactive zone, then that interactive zone can be associated with the user and the controller. If users switch zones or controllers, then the assignment of interactive zones and controllers to the users can be switched based on updated detection of the user's faces and the controllers.

Utilizing facial recognition in combination with controller tracking as described herein can provide additional functionality and benefits. For example, with continued reference to FIG. 4, a controller interactive zone 168 can be determined for the user 110. The controller interactive zone 168 is a region of the interactive environment in which the controller 116 assigned to the user 110 can be expected to be located. The controller interactive zone 168 can be determined, by way of example, based on an estimation of the user's 110 arm reach or other factors. In the illustrated embodiment, controller interactive zones 178 and 188 are determined for the users 112 and 114, respectively.

Though embodiments of the invention have thus been described with reference to facial recognition as a basis for controller pairing with specific users, in other embodiments it will be appreciated by those skilled in the art that other forms of biometric identification can be substituted or utilized in combination with facial recognition. Other biometric identifiers may include identification of a person's voice, a person size or weight, a fingerprint, etc. In one embodiment, a user's voice may be identified by requesting the user to say something such as their name, and recording and analyzing the recorded speech against a stored user speech profile to identify the user. In this regard, the user's speech profile may be generated by having the user read a predefined portion of text. In another embodiment, the user's fingerprint can be obtained by having the user place their finger on a touch sensitive portion of their controller device, and matching the obtained fingerprint to one previously stored for the user.

As discussed herein, the illuminated portions of various controllers can be configured to have different colors which facilitate their identification based on analysis of captured images from the interactive environment. During the course of gameplay, a group of users may pause their gameplay and put down their controllers, and when they return, some or all of them may pick up different controllers than the ones they were using prior to pausing their gameplay. However, despite picking up different controllers, it may still be desirable for each of the users to have the same color associated with their controller, as this color may also be associated with their gameplay. Therefore, in one embodiment, when a controller is paired with a user, it is determined whether a prior pairing during the gameplay session existed and whether it matched the currently determined pairing. If a mismatch is detected between the user's prior controller pairing and their current controller pairing, then in one embodiment, once all remaining controllers are paired with their respective users, then the user's controller color is changed to the previous color exhibited by the controller which the user operated prior to pausing gameplay.

A simple two-player example will serve to illustrate the above-described concept. For example, assume a first player operates a first controller with a portion illuminated to have a red color, and a second player operates a second controller with a portion illuminated to have a blue color. The first controller is paired with the first player and the second controller is paired with the second player based on controller identification in combination with biometric identification as previously described. Additionally, in the video game being played, the red color is associated with the first player and the blue color is associated with the second player. This color association provides an intuitive mechanism for the players to understand the relationship between their controller and elements of the video game which they control. By way of example, an avatar or character controlled by the first user might feature a red colored marker indicating that it is controlled by the first controller (illuminated red), whereas an avatar or character controlled by the second user might feature a blue colored marker indicating that it is controlled by the second controller (illuminated blue).

However, if the first player and the second player somehow switch controllers (e.g. after taking a break from gameplay and later returning), then the pairing process can be repeated to determine which controller to pair with which user. In this case, the blue controller is now paired with the first user and the red controller is not paired with the second user. Because this association of colors to the users does not match the previous association, once the controllers are paired with the users in the sense of identifying which controller is being operated by which user, then the colors exhibited by the controllers can be changed to match the prior association of colors to users. In this case, color of the second controller (now operated by the first user) is changed from blue to red, restoring the first user to a red colored controller; and the color of the first controller (now operated by the second user) is changed from red to blue, restoring the second user to a blue colored controller.

Figure 5:
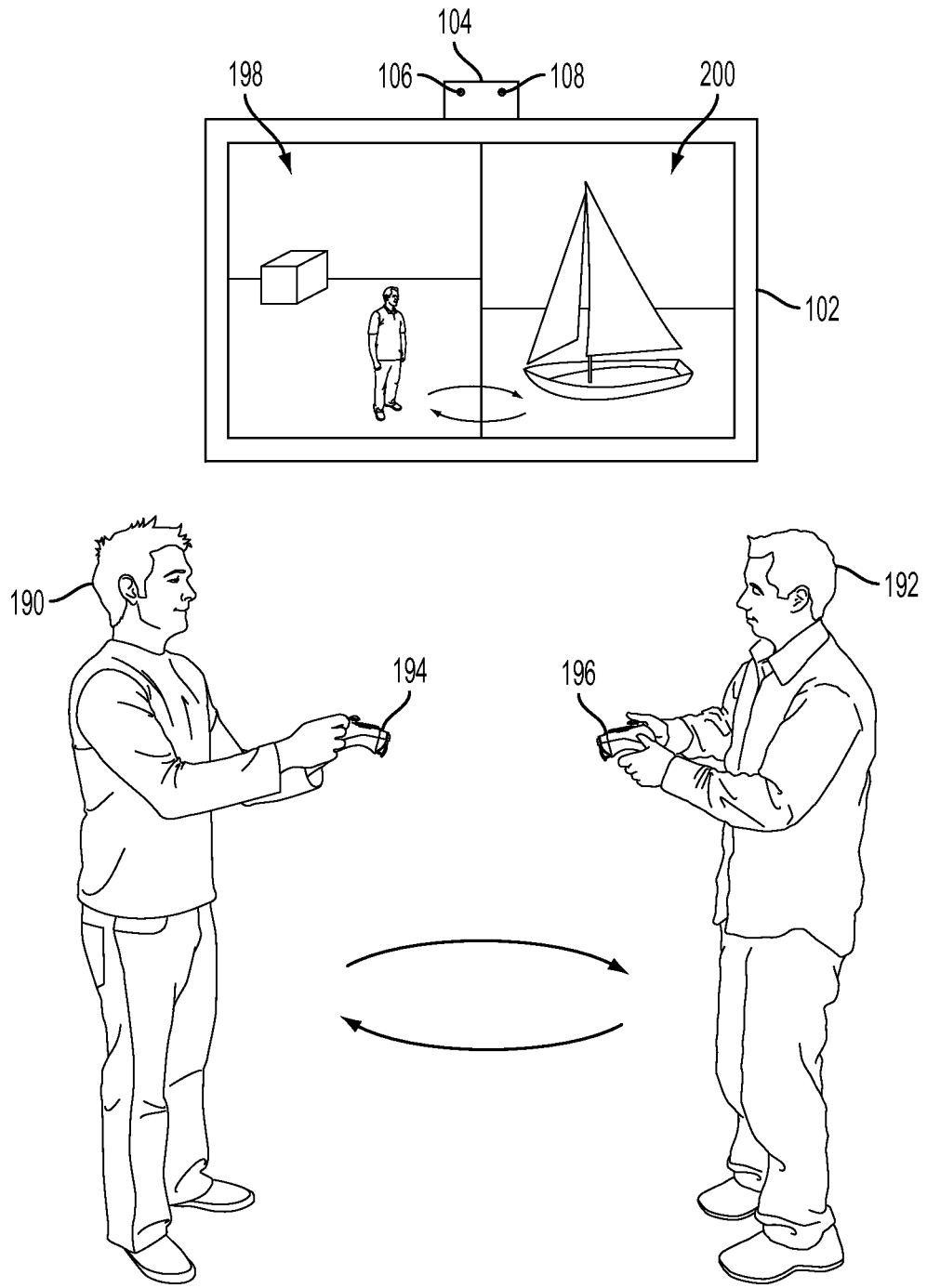
FIG. 5 illustrates two players interacting with a video game, in accordance with an embodiment of the invention.

FIG. 5 illustrates two players interacting with a video game, in accordance with an embodiment of the invention. In the illustrated embodiment, the players 190 and 192 operate controllers 194 and 196, respectively. The video game is rendered on the display 102 in a split-screen mode. As the user 190 is positioned on the left in the interactive environment and the user 192 is positioned on the right, for ease of viewing, the video game views are assigned in the split-screen mode so that the video game view for the user 190 is rendered on a left portion 198 of the display 102, and the video game view of the user 192 is rendered on a right portion 200 of the display 102. However, if the users 190 and 192 switch places, then based on controller recognition or facial recognition, it can be determined that the users have switched places, and the video game views can be reassigned to the opposite side of the split-screen. Thus, when users 190 and 192 have switched places, their faces or controllers are detected and recognized, and the video game view for user 192 is now shown on the left portion 198, whereas the video game view for the user 190 is shown on the right portion 200. While the foregoing embodiment has been described in terms of two users with corresponding left and right split screen portions, it will be appreciated by those skilled in the art that there be any number of users and corresponding split screen portions, which may be assigned to each other in accordance with embodiments of the invention.

Figure 6:
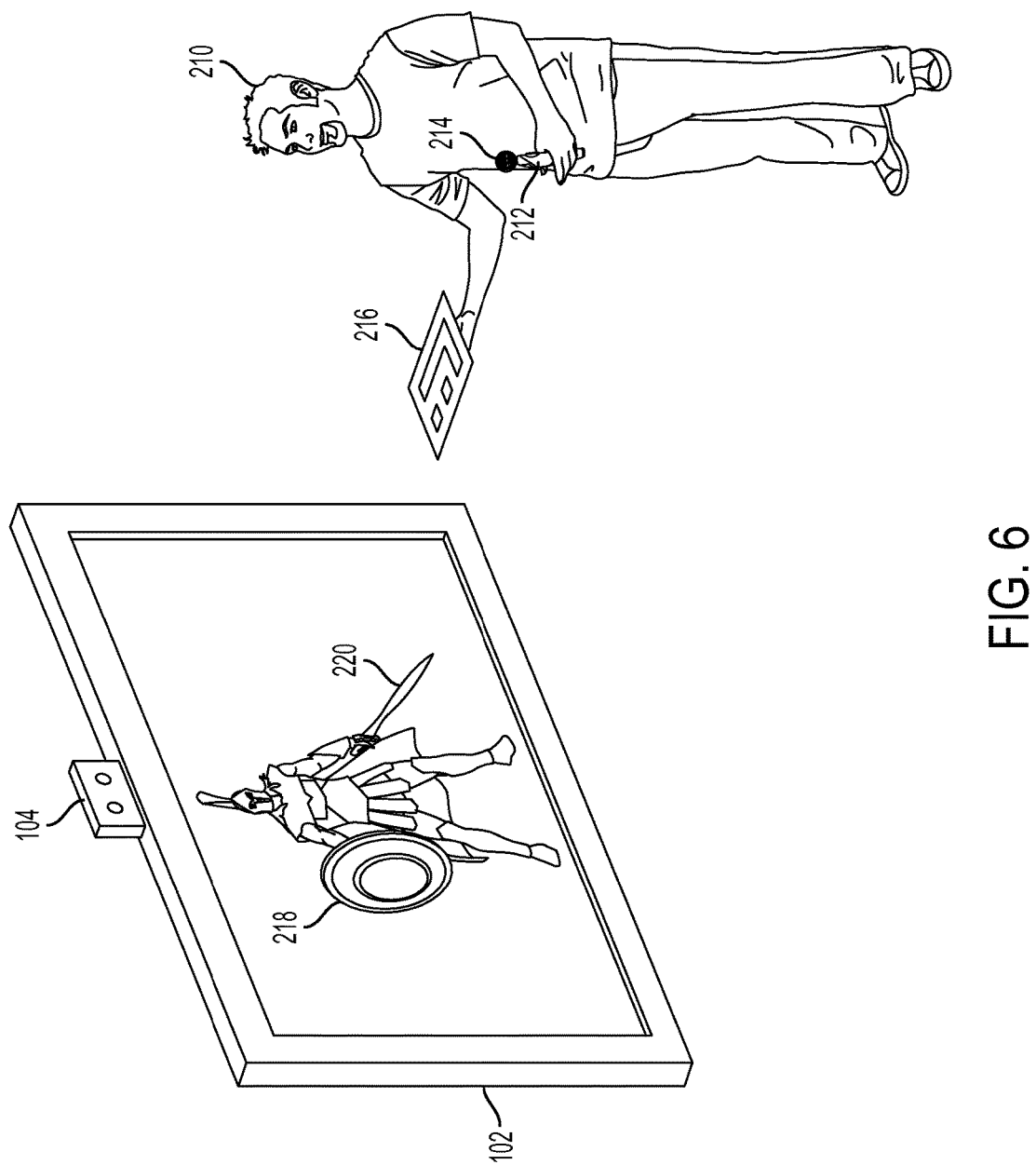
FIG. 6 illustrates a user operating a motion controller 212 in an interactive environment, in accordance with an embodiment of the invention.

FIG. 6 illustrates a user 210 operating a motion controller 212 in an interactive environment, in accordance with an embodiment of the invention. The motion controller 212 includes an illuminated tracking feature 214 which is tracked based on analysis of images captured by the low exposure camera 108 of the image capture device 104. Additionally, the user 210 is holding an augmented reality (AR) tag 216. The AR tag is identified and tracked based on analysis of captured images from the high exposure camera 106 of the image capture device 104. In one embodiment, the AR tag is replaced with an object 218 in video of the user displayed on the display 102. The controller 212 is replaced with an object 220 in the displayed video. The application of two cameras configured to operate at differing exposure levels and/or resolutions enables the simultaneous identification and tracking of illuminated tracking features and AR tags. It will be appreciated that in addition to AR tags, various other augmented reality methods can be applied based on analysis of the captured images from the high exposure camera 106 of the image capture device 104. This can be combined with simultaneous tracking of an illuminated tracking feature to provide an enhanced user interactive experience.

Figure 7:
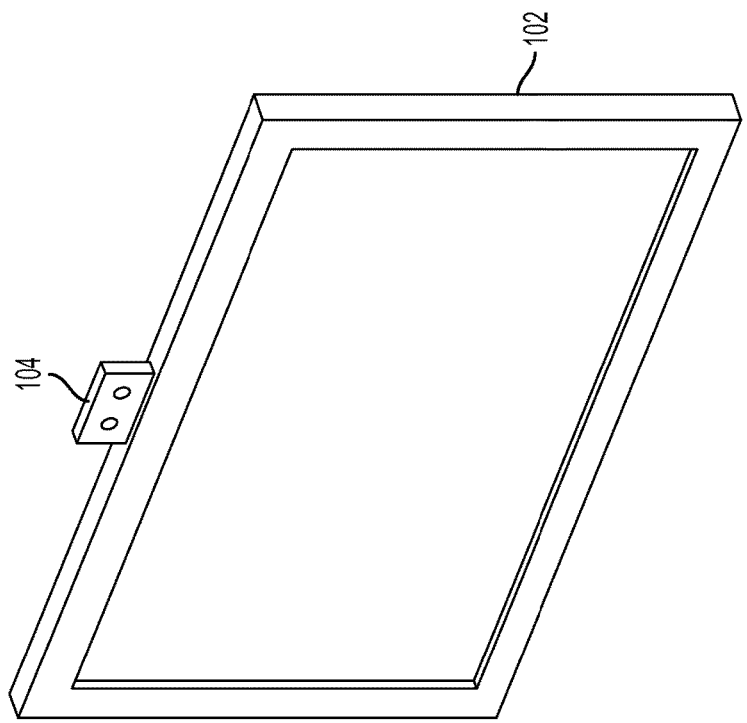
FIG. 7 illustrates a user interacting with an interactive application rendered on a display, in accordance with an embodiment of the invention.
Figure 7:
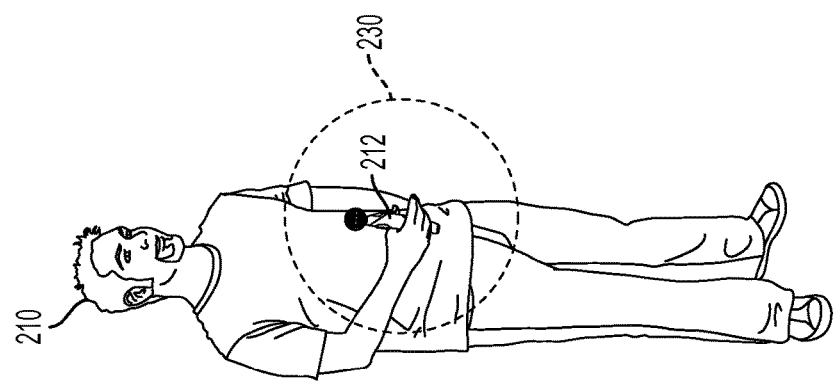

FIG. 7 illustrates a user 210 interacting with an interactive application rendered on a display 102, in accordance with an embodiment of the invention. The controller 212 is associated with the user 210, in accordance with methods and principles described elsewhere is the present disclosure. In one embodiment, a gesture region 230 is identified for the user 210. The gesture region 230 is analyzed to detect gestures by the user 210 for interactivity with the interactive application. In one embodiment, the gesture detection is based on analysis of the captured images from the high exposure camera, whereas the tracking of the controller 212 is based on analysis of the captured images from the low exposure camera as has been described. The gesture region may be determined to be a region proximate to the location of the controller. In one embodiment, the gesture region is determined by identifying the hand of the user which is holding the controller and identifying a region proximate to the controller, but centered about a point on the side of the controller on which the non-controller holding hand of the user is located. In yet another embodiment, the gesture region is defined as a region above and or to the sides of the controller, as the user may gesture in such a region when the user is operating a controller designed to be held by both hands of the user.

In some embodiments, as has been noted, the image capture device 104 can include two cameras which are operated in different manners to achieve high quality image capture and high fidelity tracking of an illuminated object. The two cameras may be operated so that one produces high quality images at a higher resolution and exposure, while the other produces low quality images at a lower resolution and exposure. Furthermore, the individual framerates of each of the cameras may differ. By way of example, the high quality camera may require longer exposure times to achieve higher exposure, therefore necessitating a lower framerate.

Whereas the low quality camera may require shorter exposure times to achieve a comparatively lower exposure, therefore providing for a faster framerate that is beneficial for tracking purposes.

Figure 8:
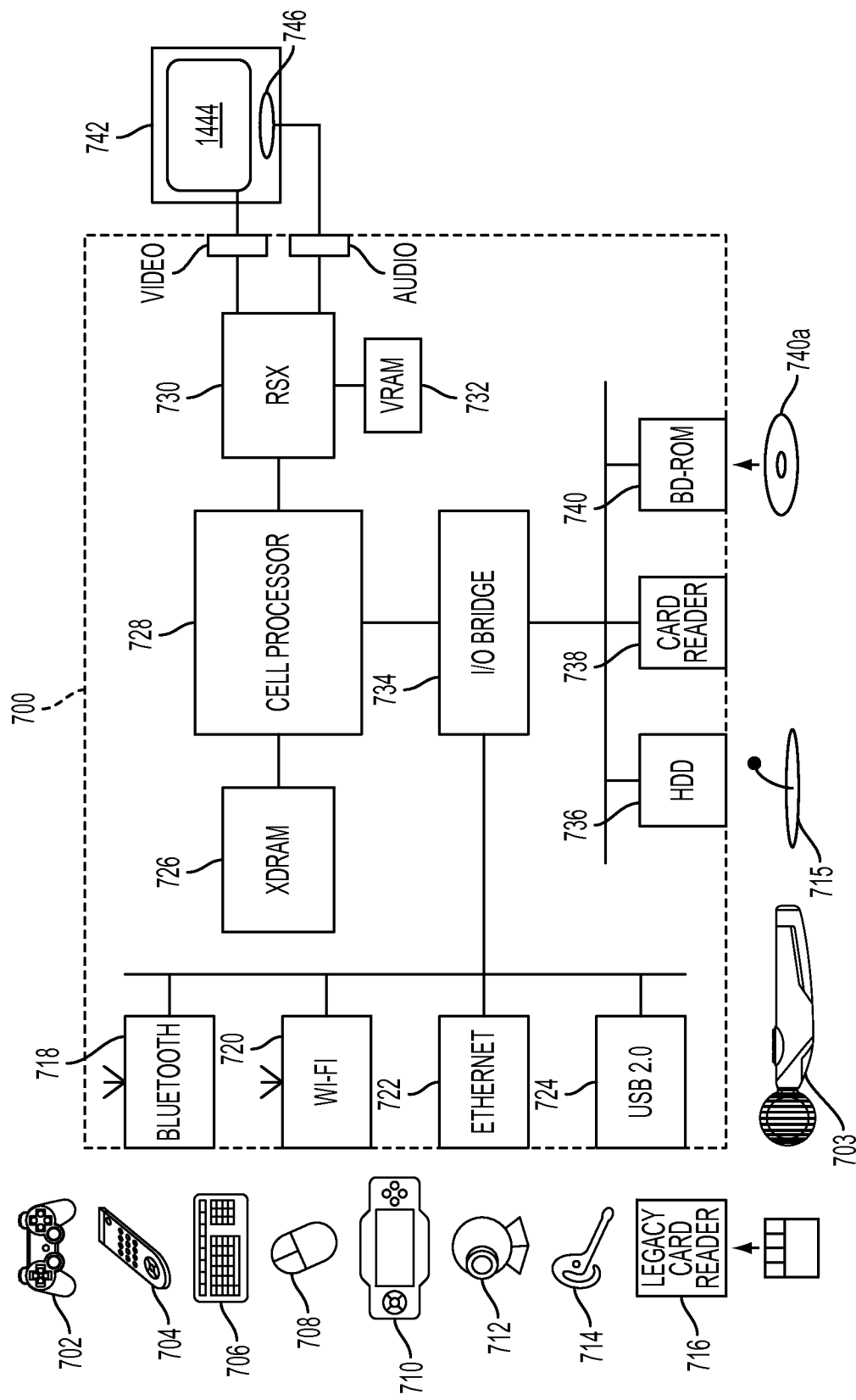
FIG. 8 illustrates hardware and user interfaces that may be used to provide interactivity with a video game, in accordance with one embodiment of the present invention.

FIG. 8 illustrates hardware and user interfaces that may be used to provide interactivity with a video game, in accordance with one embodiment of the present invention. FIG. 8 schematically illustrates the overall system architecture of the Sony® Playstation 3® entertainment device, a console that may be compatible for interfacing a control device with a computer program executing at a base computing device in accordance with embodiments of the present invention. A system unit 700 is provided, with various peripheral devices connectable to the system unit 700. The system unit 700 comprises: a Cell processor 728; a Rambus® dynamic random access memory (XDRAM) unit 726; a Reality Synthesizer graphics unit 730 with a dedicated video random access memory (VRAM) unit 732; and an I/O bridge 734. The system unit 700 also comprises a Blu Ray® Disk BD-ROM® optical disk reader 740 for reading from a disk 740a and a removable slot-in hard disk drive (HDD) 736, accessible through the I/O bridge 734. Optionally the system unit 700 also comprises a memory card reader 738 for reading compact flash memory cards, Memory Stick® memory cards and the like, which is similarly accessible through the I/O bridge 734.

The I/O bridge 734 also connects to six Universal Serial Bus (USB) 2.0 ports 724; a gigabit Ethernet port 722; an IEEE 802.11b/g wireless network (Wi-Fi) port 720; and a Bluetooth® wireless link port 718 capable of supporting up to seven Bluetooth connections.

In operation, the I/O bridge 734 handles all wireless, USB and Ethernet data, including data from one or more game controllers 702-703. For example when a user is playing a game, the I/O bridge 734 receives data from the game controller 702-703 via a Bluetooth link and directs it to the Cell processor 728, which updates the current state of the game accordingly.

The wireless, USB and Ethernet ports also provide connectivity for other peripheral devices in addition to game controllers 702-703, such as: a remote control 704; a keyboard 706; a mouse 708; a portable entertainment device 710 such as a Sony Playstation Portable® entertainment device; a video camera such as an EyeToy® video camera 712; a microphone headset 714; and a microphone 715. Such peripheral devices may therefore in principle be connected to the system unit 700 wirelessly; for example the portable entertainment device 710 may communicate via a Wi-Fi ad-hoc connection, whilst the microphone headset 714 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 716 may be connected to the system unit via a USB port 724, enabling the reading of memory cards 748 of the kind used by the Playstation® or Playstation 2® devices.

The game controllers 702-703 are operable to communicate wirelessly with the system unit 700 via the Bluetooth link, or to be connected to a USB port, thereby also providing power by which to charge the battery of the game controllers 702-703. Game controllers 702-703 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 702 is a controller designed to be used with two hands, and game controller 703 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 704 is also operable to communicate wirelessly with the system unit 700 via a Bluetooth link. The remote control 704 comprises controls suitable for the operation of the Blu Ray™ Disk BD-ROM reader 540 and for the navigation of disk content.

The Blu Ray™ Disk BD-ROM reader 740 is operable to read CD-ROMs compatible with the Playstation and PlayStation 2 devices, in addition to conventional pre-recorded and recordable CDs, and so-called Super Audio CDs. The reader 740 is also operable to read DVD-ROMs compatible with the Playstation 2 and PlayStation 3 devices, in addition to conventional pre-recorded and recordable DVDs. The reader 740 is further operable to read BD-ROMs compatible with the Playstation 3 device, as well as conventional pre-recorded and recordable Blu-Ray Disks.

The system unit 700 is operable to supply audio and video, either generated or decoded by the Playstation 3 device via the Reality Synthesizer graphics unit 730, through audio and video connectors to a display and sound output device 742 such as a monitor or television set having a display 744 and one or more loudspeakers 746. The audio connectors 750 may include conventional analogue and digital outputs whilst the video connectors 752 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 728. The Playstation 3 device's operating system supports Dolby® 5.1 surround sound, Dolby® Theatre Surround (DTS), and the decoding of 7.1 surround sound from Blu-Ray® disks.

In the present embodiment, the video camera 712 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 700. The camera LED indicator is arranged to illuminate in response to appropriate control data from the system unit 700, for example to signify adverse lighting conditions. Embodiments of the video camera 712 may variously connect to the system unit 700 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 700, an appropriate piece of software such as a device driver should be provided. Device driver technology is well-known and will not be described in detail here, except to say that the skilled man will be aware that a device driver or similar software interface may be required in the present embodiment described.

Figure 9:
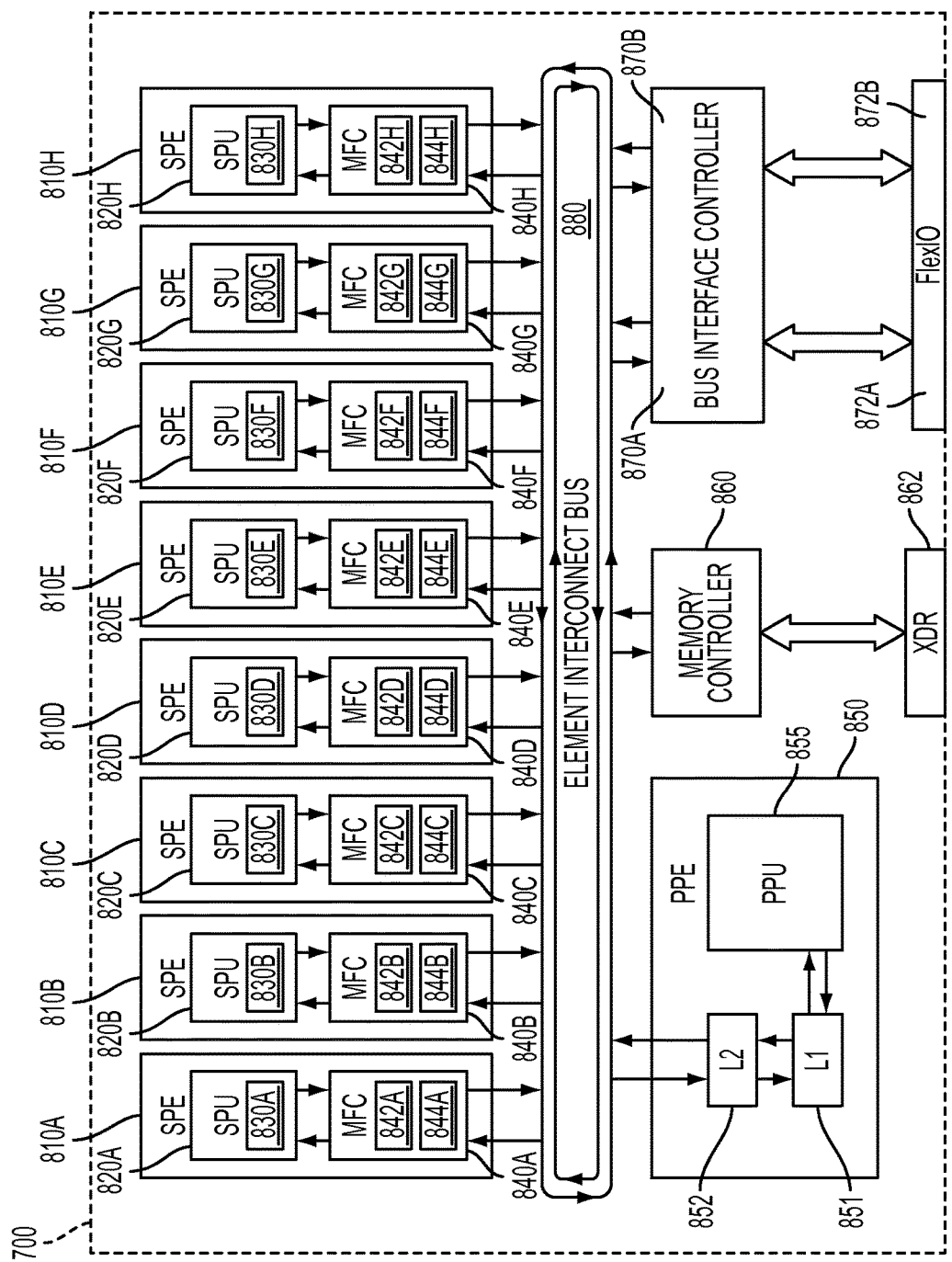
FIG. 9 illustrates additional hardware that may be used to process instructions, in accordance with one embodiment of the present invention.

FIG. 9 illustrates additional hardware that may be used to process instructions, in accordance with one embodiment of the present invention. Cell processor 728 has an architecture comprising four basic components: external input and output structures comprising a memory controller 860 and a dual bus interface controller 870A, B; a main processor referred to as the Power Processing Element 850; eight co-processors referred to as Synergistic Processing Elements (SPEs) 810A-H; and a circular data bus connecting the above components referred to as the Element Interconnect Bus 880. The total floating point performance of the Cell processor is 218 GFLOPS, compared with the 6.2 GFLOPs of the Playstation 2 device's Emotion Engine.

The Power Processing Element (PPE) 850 is based upon a two-way simultaneous multithreading Power 570 compliant PowerPC core (PPU) 855 running with an internal clock of 3.2 GHz. It comprises a 512 kB level 2 (L2) cache and a 32 kB level 1 (L1) cache. The PPE 850 is capable of eight single position operations per clock cycle, translating to 25.6 GFLOPs at 3.2 GHz. The primary role of the PPE 850 is to act as a controller for the Synergistic Processing Elements 810A-H, which handle most of the computational workload. In operation the PPE 850 maintains a job queue, scheduling jobs for the Synergistic Processing Elements 810A-H and monitoring their progress. Consequently each Synergistic Processing Element 810A-H runs a kernel whose role is to fetch a job, execute it and synchronized with the PPE 850.

Each Synergistic Processing Element (SPE) 810A-H comprises a respective Synergistic Processing Unit (SPU) 820A-H, and a respective Memory Flow Controller (MFC) 840A-H comprising in turn a respective Dynamic Memory Access Controller (DMAC) 842A-H, a respective Memory Management Unit (MMU) 844A-H and a bus interface (not shown). Each SPU 820A-H is a RISC processor clocked at 3.2 GHz and comprising 256 kB local RAM 830A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 820A-H does not directly access the system memory XDRAM 726; the 64-bit addresses formed by the SPU 820A-H are passed to the MFC 840A-H which instructs its DMA controller 842A-H to access memory via the Element Interconnect Bus 880 and the memory controller 860.

The Element Interconnect Bus (EIB) 880 is a logically circular communication bus internal to the Cell processor 728 which connects the above processor elements, namely the PPE 850, the memory controller 860, the dual bus interface 870A,B and the 8 SPEs 810A-H, totaling 12 participants. Participants can simultaneously read and write to the bus at a rate of 8 bytes per clock cycle. As noted previously, each SPE 810A-H comprises a DMAC 842A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz.

The memory controller 860 comprises an XDRAM interface 862, developed by Rambus Incorporated. The memory controller interfaces with the Rambus XDRAM 726 with a theoretical peak bandwidth of 25.6 GB/s.

The dual bus interface 870A,B comprises a Rambus FlexIO® system interface 872A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 734 via controller 870A and the Reality Simulator graphics unit 730 via controller 870B.

Data sent by the Cell processor 728 to the Reality Simulator graphics unit 730 will typically comprise display lists, being a sequence of commands to draw vertices, apply textures to polygons, specify lighting conditions, and so on.

Figure 10:
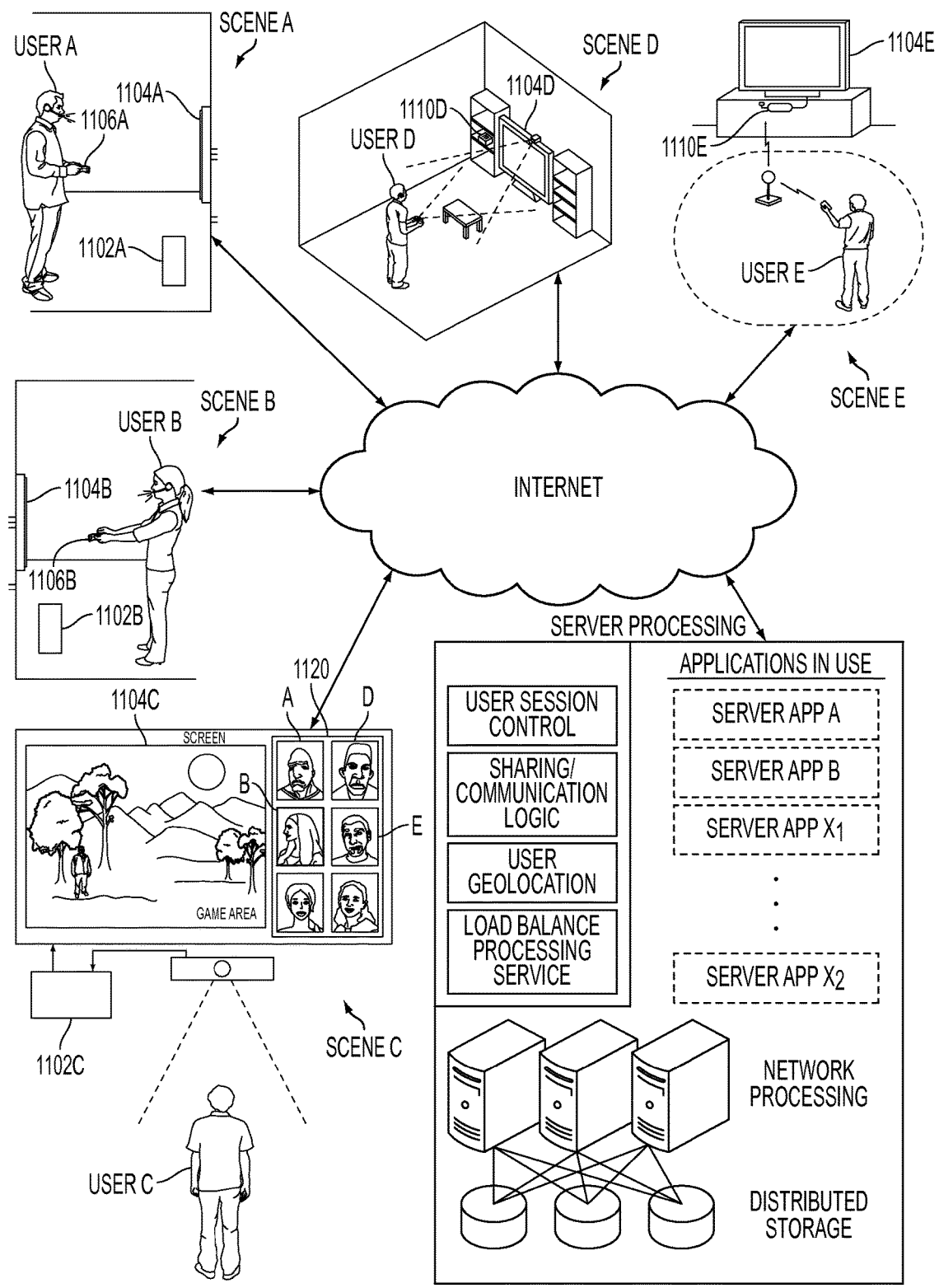
FIG. 10 is an exemplary illustration of scene A through scene E with respective user A through user E interacting with game clients 1102 that are connected to server processing via the internet, in accordance with one embodiment of the present invention.

FIG. 10 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 10, user A interacts with a client application displayed on a monitor 1104A using a controller 1106A paired with game client 1102A. Similarly, within scene B, user B interacts with another client application that is displayed on monitor 1104B using a controller 1106B paired with game client 1102B. Scene C illustrates a view from behind user C as he looks at a monitor displaying a game and buddy list from the game client 1102C. While FIG. 10 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 1104C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

Figure 11:
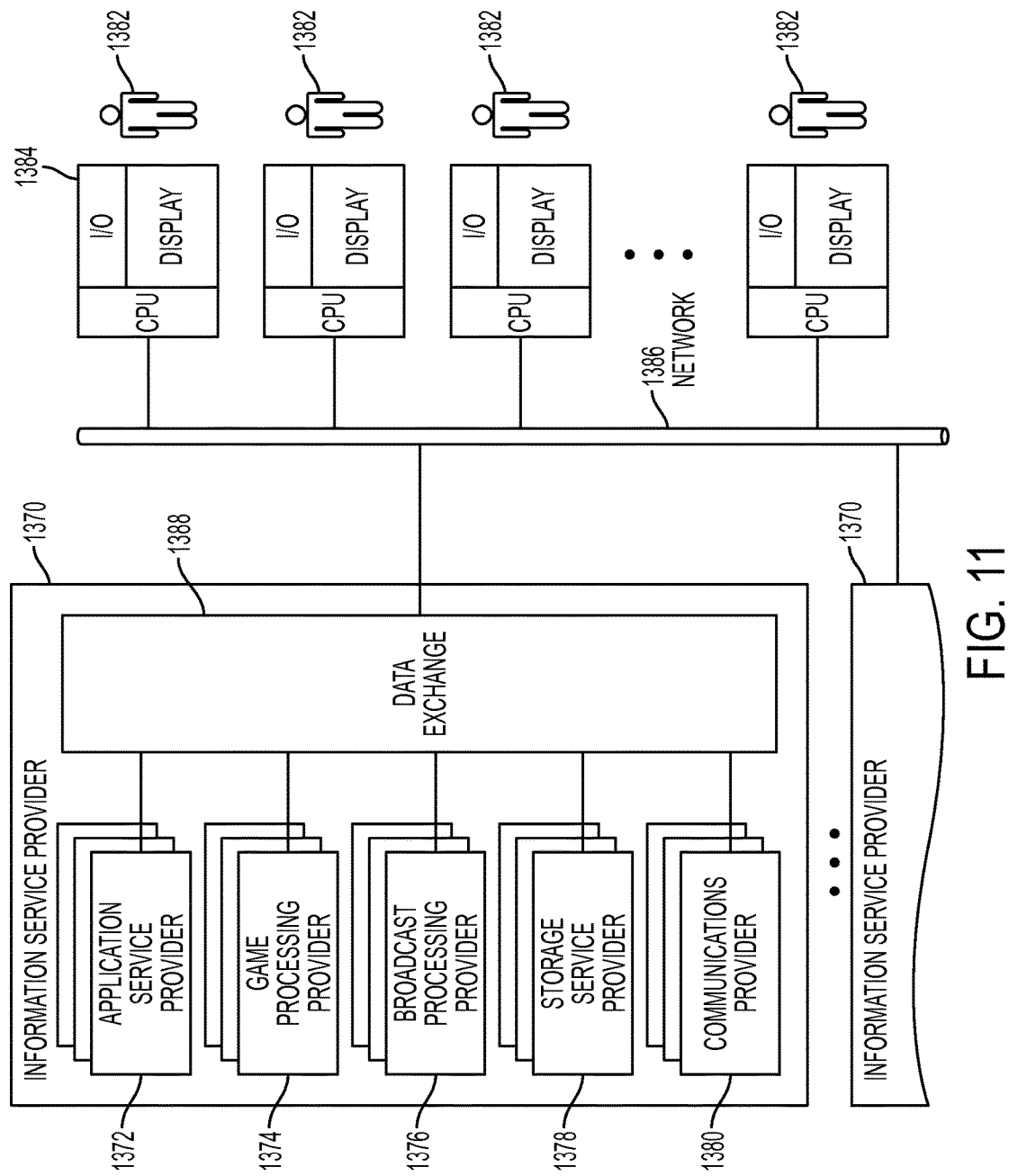
FIG. 11 illustrates an embodiment of an Information Service Provider architecture.

FIG. 11 illustrates an embodiment of an Information Service Provider architecture. Information Service Providers (ISP) 1370 delivers a multitude of information services to users 1382 geographically dispersed and connected via network 1386. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 1370 includes Application Service Provider (ASP) 1372, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 1370 includes a Game Processing Server (GPS) 1374 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1376 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1378 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 380 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1388 interconnects the several modules inside ISP 1370 and connects these modules to users 1382 via network 1386. Data Exchange 1388 can cover a small area where all the modules of ISP 1370 are in close proximity, or can cover a large geographic area when the different modules are geographically dispersed. For example, Data Exchange 1388 can include a fast Gigabit Ethernet (or faster) within a cabinet of a data center, or an intercontinental virtual area network (VLAN).

Users 1382 access the remote services with client device 1384, which includes at least a CPU, a display and I/O. The client device can be a PC, a mobile phone, a netbook, a PDA, etc. In one embodiment, ISP 1370 recognizes the type of device used by the client and adjusts the communication method employed. In other cases, client devices use a standard communications method, such as html, to access ISP 1370.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An image capture device for providing input to an interactive application, comprising:
   a housing;
   a first camera defined along a front surface of the housing;
   a first camera controller configured to control the first camera to capture images of an interactive environment during user interactivity at a first exposure setting, the captured images from the first camera being analyzed to detect a dynamic range of the interactive environment and to track a user;
   a second camera defined along the front surface of the housing;
   a second camera controller configured to control the second camera to capture images of the interactive environment during the user interactivity at a second exposure setting lower than the first exposure setting, the captured images from the second camera being analyzed to track an illuminated object in the interactive environment;
   wherein a light intensity of the illuminated object is adjusted using the detected dynamic range of the interactive environment so as to be among the brighter objects in the interactive environment.

2. The image capture device of claim 1, wherein tracking the user includes tracking a face of the user.

3. The image capture device of claim 1, wherein the first camera and the second camera are horizontally aligned along the front surface of the housing.

4. The image capture device of claim 1, further comprising a microphone array for capturing sound from the interactive environment.

5. The image capture device of claim 1, wherein the first camera controller is configured to control the first camera to capture images of the interactive environment prior to the user interactivity, the images captured prior to the user interactivity being analyzed to determine the first exposure setting.

6. The image capture device of claim 1, wherein the second camera controller is configured to control the second camera to capture images of the interactive environment prior to the user interactivity, the images captured prior to the user interactivity being analyzed to determine the second exposure setting.

7. A system for facilitating interactivity with an interactive application, comprising:
   a controller device having an illuminated object;
   an image capture device, the image capture device including a first camera, a second camera, a first camera controller configured to control the first camera to capture images of an interactive environment during user interactivity at a first exposure setting, and a second camera controller configured to control the second camera to capture images of the interactive environment during the user interactivity at a second exposure setting lower than the first exposure setting;
   a computing device connected t the image capture device, the computing device configured to execute the interactive application, the computing device configured to analyze the captured images from the first camera to track a user in the interactive environment, wherein the captured images from the first camera are not analyzed to track the illuminated object, the computing device configured to analyze the captured images from the second camera to track the illuminated objects in the interactive environment, wherein the captured images from the second camera are not analyzed to track the user,
   wherein the computing device is configured to adjust a light intensify of the illuminated object in response to a detected dynamic range of the interactive environment so as to be among the brighter objects in the interactive environment.

8. The system of claim 7, wherein tracking the user includes tracking a face of the user.

9. The system of claim 7, wherein the first camera and the second camera are horizontally aligned along the front surface of the housing.

10. The system of claim 7, further comprising a microphone array for capturing sound from the interactive environment.

11. The system of claim 7, wherein the first camera controller is configured to control the first camera to capture images of the interactive environment prior to the user interactivity, the images captured prior to the user interactivity being analyzed to determine the first exposure setting.

12. The system of claim 7, wherein the second camera controller is configured to control the second camera to capture images of the interactive environment prior to the user interactivity, the images captured prior to the user interactivity being analyzed to determine the second exposure setting.

13. A method for interactivity with an interactive application, comprising:
   capturing images from an interactive environment during user interactivity at a first exposure setting;
   analyzing the images captured at the first exposure setting to track a user;
   simultaneous with the capturing images at the first exposure setting, capturing images from the interactive environment during the user interactivity at a second exposure setting lower than the first exposure setting;
   analyzing the images captured at the second exposure setting to track an illuminated object in the interactive environment, wherein the images captured at the second exposure setting are not analyzed to track the user;
   adjusting a light intensity of the illuminated object in response to a detected dynamic range of the interactive environment so as to be among the brighter objects in the interactive environment.

14. The method of claim 13, wherein tracking the user includes tracking a face of the user.

15. The method of claim 13, further comprising, analyzing the images captured at the first exposure setting to identify and track an AR tag.

16. The method of claim 13, further comprising, capturing sound from the interactive environment.

17. The method of claim 13, further comprising,
   capturing images of the interactive environment prior to the user interactivity; and
   analyzing the images captured prior to the user interactivity to determine one or more of the first exposure setting or the second exposure setting.

* * * * *